ated July 1, 1958

2,841,531
PROCESS FOR SPLITTING RACEMATES

Albert Wettstein and Ernst Vischer, Basel, Switzerland, assignors to Ciba Pharmaceutical Products, Inc., Summit, N. J.

No Drawing. Application August 16, 1956
Serial No. 604,334

Claims priority, application Switzerland August 25, 1955

15 Claims. (Cl. 195—2)

This invention relates to a new process for splitting racemates. More particularly it concerns a process for splitting racemates by subjecting them to the action of a reducing enzyme.

It is known to reduce steroid compounds having the natural configuration with the aid of micro-organisms. The present invention is based on the unexpected observation that d:l-steroid compounds are acted upon differently by these micro-organisms in that substantially only the d-form, that is to say the enantiomorphic form corresponding to the natural steroids, is reduced and that the l-form remains unchanged. Accordingly, this invention provides a new and useful process for splitting racemates in which, in addition to the reduced d-steroid, there is obtained an l-steroid, l-steroids being known only in a few instances.

In the new process a d:l-steroid containing at least one reducible grouping is subjected to the action of a reducing enzyme produced by the culture of a micro-organism, and at least one of the enantiomorphic forms is isolated.

Starting materials for the new process may be any d:l-steroids containing carbon-to-oxygen double bonds and/or carbon-to-carbon double bonds, for example, d:l-compounds of the cholestane, coprostane, cholane, spirostane, furostane, butanolid, cardanolid series, and especially of the pregnane, androstane and testane series, and also their higher or lower homologues, for example, the corresponding A-nor-, D-homo- and 19-nor-compounds. Double bonds may be present, for example, in the 1- and/or 4-, 5-, 6-, 7-, 9-, 11-, 14-, 15- and/or 16-positions. As substituents there come into consideration more especially free or functionally converted hydroxyl, oxo or carboxyl groups, such as ester, amide, nitrile, ether, thioester, thioether, thiol- or thion-ester, acetal, mercaptal, ketal, hydrazone, semicarbazone and enol groups, for example, in the 2-, 3-, 6-, 7-, 11-, 12-, 16-, 17-, 18-, 19-, 20- or 21-positions, and also halogen atoms especially chlorine or fluorine, for example, in the 9- or 17- position, or epoxy groups, for example, in the 9:11- or 16:17-position. The new process is of special interest for use with d:l-pregnane, androstane and oestrane compounds. Specific starting materials of these series are, inter alia, d:l-progesterone, d:l-17α-progesterone, d:l-16α-hydroxy-progesterone, d:l-17α-hydroxy-progesterone, d:l-11-oxo-progesterone, d:l-11α- and also -11β-hydroxy-progesterone, d:l-9:11- or 11:12 or 16:17-dehydro-progesterone, d:l-19-oxo-progesterone, d:l-11-oxo-17α-hydroxy-progesterone, d:l-11α- or -11β-hydroxy-17α-hydroxy-progesterone, d:l-9-choro- or 9-fluoro-11β:17α-dihydroxy-progesterone, d:l-11β:18-dihydroxy-progesterone, d:l - 11β:17:18 - trihydroxy - progesterone, d:l - 11β-hydroxy - 18 - oxo - progesterone, d:l - 9 - chloro- or -9-fluoro-11β-hydroxy-18-oxo-progesterone, d:l-11:18-dioxo-progesterone, d:l-19-nor-progesterone, d:l-19-nor-11β-hydroxy-18-oxo-progesterone, d:l-cortexone, d:l - 18 - hydroxy or 18-oxo-cortexone, d:l-cortisone, d:l-hydrocortisone, d:l-17α-hydroxy-cortexone, d:l-aldosterone, d:l-pregnenolone, the corresponding 1-dehydro-compounds, for example, d:l-1-dehydroprogesterone, d:l-1-dehydro-17α-hydroxy-progesterone, d:l-1-dehydro-11-oxo- or -11α-hydroxy- or 11β-hydroxy-progesterone, dehydroisoandrosterone, androstene-dione, oestrone, or functional derivatives thereof. Especially important starting materials for the aldosterone synthesis are, for example, d:l-Δ$^4$ - 3:20 - dioxo - 11β - hydroxy - pregnene - 18 - acidlactone - (18→11), d:l - Δ$^4$ - 3:18:20-trioxo-11β-hydroxy-pregnene or its 18:11-cyclo-semiacetal and d:l-Δ$^4$-3:20-dioxo-11β:18-dihydroxy-pregnene. There may also be mentioned the corresponding compounds hydroxylated in the 17α-position, and also the lactone of d:l-Δ$^4$-3:16-dioxo-11β-hydroxy-18-carboxy-androstene, d:l-Δ$^{4:18}$-3:16 dioxo - 11β:18α - oxido - 18α - methyl - 18 - homoandrostadiene and corresponding compounds unsaturated in the 14:15-position.

The process is advantageously carried out by causing the culture of an individual micro-organism to act on the starting materials. Depending on the micro-organism used there is obtained, for example, the d-steroid in which an oxo-group or carbon-to-carbon double bond has been saturated with hydrogen. It may also be carried out by causing several cultures to act in one operation on the starting material, in which case it is of advantage to cause the different cultures to act on the starting material in succession.

There are suitable for the process all cultures of micro-organisms which are capable of reducing the starting materials. A few species of organisms suitable for the process may be mentioned by way of example:

*Saccharomyces cerevisiae, Bacterium putrificus, Streptomyces coelicolor* and *Streptomyces lavendulae.*

As is apparent from the foregoing, the micro-organisms used may be fungi or bacteria.

In carrying out the process the starting materials may be incubated with cultures of the aforesaid micro-organisms under known anaerobic conditions, or even aerobic conditions. The growth may take place in a surface culture or, preferably, a submerged culture, the material being agitated or stirred. The cultures contain assimilable carbon, for example carbohydrates, and if desired growth-promoting substances, for example, cornsteep liquor or beer wirt, and inorganic salts. Accordingly, natural, synthetic or semi-synthetic nutrient solutions may be used.

The following gives a description of the simplest method of carrying out the process, but the invention is not limited thereto: The organisms are cultivated in apparatus and under conditions similar to those known as the so-called deep tank method in the production of antibiotics. After developing the culture, the starting material is added in the form of a fine dispersion or solution, for example in methanol, acetone or ethylene glycol, and incubation is continued. Finally the mycelium is separated, the filtrate and/or the mycelium mass is extracted, and the d-form and/or the l-form is isolated from the extract in known manner, for example, by a demixing method, adsorption, chromatography, crystallization, conversion into functional derivatives such as Girard compounds or the like. The reactions may also be carried out by first separating the active enzymes from the corresponding cultures of the aforesaid organisms and using them in the absence of the growing cultures. Thus, for example, the mycelium formed from the culture of the organism is separated, suspended in water or a buffer solution, and then the starting material is added to the resulting suspension and incubated.

If it is desired to use several micro-organisms in one operation, the procedure may be, for example, as follows: After developing the culture of the first organism the starting material is added in the form of a fine dispersion or solution, for example, in methanol, acetone or ethylene glycol, and incubation is continued until the maximum reaction has been attained. Then, without previous filtration or isolation of the reaction product, there is added to the reaction mixture a grown culture of the second organism and, if necessary, appropriate nutrient substances and growth-promoting substances, and the incubation is continued. The course of the different reductions can be followed by paper chromatography.

Racemate splitting by the new process is generally very simple, because the reduced derivative of one of the antipodes can easily be separated from the other unchanged antipode owing to their different polarity. The obtained known antipodes have well recognized therapeutically useful properties or can be used as intermediate.

As a result of the classical investigations of Pasteur a microbiological method for recovering an antipode from racemates has occasionally been used. Ordinarily fungi or bacteria have been used for this purpose, which assimilate the starting materials, the natural (d) antipodes being assimilated more rapidly than the non-natural (l) antipodes. In these processes, therefore, in order to obtain an optically pure product, the microbiological treatment must be continued until at least one form, and usually the biologically more interesting form, has been completely destroyed. In contradistinction thereto, the new process yields even with only partial reaction the converted antipodes, which are usually the biologically more interesting ones, in an optically pure form. When in the new process one of the antipodes reacts completely, the other antipode is likewise obtained in an optically pure form.

The following examples illustrate the invention:

Example 1

2 grams of crude glucose, 1 gram of peptone, 0.6 gram of meat extract (Oxo Lab. Lemco), 1 gram of sodium chloride and 2 grams of calcium carbonate are suspended or dissolved in 200 cc. of water, then adjusted to a pH value of 7.5 and sterilized. The mixture is then inoculated with a culture of *Streptomyces coelicolor* and agitated for 3 days of 27° C. There is then added under sterile conditions a solution of 50 milligrams of d:l-17α-hydroxy-cortexone in 4 cc. of methanol, and the whole is further agitated at the same temperature. After 2 days the mycelium is separated off, and the culture filtrate is extracted by agitation three times with ethyl acetate. The extracts are washed with water, dried and evaporated. The residue is chromatographed over 2 grams of silica gel by fractional elutriation, which is carried out with ether, mixtures of ether and ethyl acetate and with ethyl acetate. The individual fractions (each of 10 cc.) are examined by paper chromatography. The ether fractions contain 17α-hydroxy-cortexone, and the ether-ethyl acetate fractions (90:10, 80:20 and 50:50) contain $\Delta^4$-3-keto-17α:20β:21-trihydroxy-pregnene. The ether fractions and the ether-ethyl acetate fractions, respectively, are combined and evaporated separately. By crystallization from acetone there is obtained l-17α-hydroxy-cortexone melting at 209–212° C. and having the specific rotation $[\alpha]_D^{30} = -140°$ (ethanol), and d - $\Delta^4$ - 3 - keto - 17α:20β:21 - trihydroxy-pregnene melting at 193–194° C. and having the specific rotation $[\alpha]_D^{24} = +74°$ (ethanol).

Example 2

The nutrient solution described in Example 1 is inoculated with *Streptomyces lavendulae* and after the addition of d:l-17α-hydroxy-cortexone and incubation in an analogous manner followed by working up there are likewise obtained l-17α-hydroxy-cortexone and d-$\Delta_4$-3-keto-17α:20β:21-trihyroxy-pregnene.

Example 3

A solution of 20 grams of glucose in 100 cc. of tap water is sterilised in an Erlenmeyer flask, and then 10 grams of fresh pressed yeast (*Saccharomyces cerevisiae*) are added. The flask is agitated for 4 hours at 28° C., then a solution of 100 milligrams of d:l-oestrone in 5 cc. of dioxane is added, and agitation is continued at the same temperature. After 1, 2, 3, 4, and 5 days, there are added 10 grams of yeast, 20 grams of glucose in 30 cc. of water, and then after 7 days the reaction mixture is exhaustively extracted with ether. The ethereal extracts are washed with a saturated solution of sodium hydrogen carbonate and water, dried and evaporated. The residue, which consists of l-oestrone, and d-oestradiol-(17β), is split up by paper chromatography. By recrystallization from aqueous methanol there is obtained l-oestrone melting at 257–259° C. and having the specific rotation $[\alpha]_D = -163°$, and d-oestradiol-(17β) melting at 177–178° C. and having the specific rotation $[\alpha]_D = +82°$ (ethanol).

What is claimed is:

1. Process for splitting racemates of d,l-steroids, which comprises subjecting a d,l-steroid containing at least one reducible group to the action of a reducing enzyme, which enzyme is produced by the culture of a micro-organism, whereby at least one of the reducible groups of the d-antipode of the starting racemate is reduced and the l-antipode remains unchanged, and isolating at least one of these enantiomorphic forms.

2. Process according to claim 1, wherein a culture of a micro-organism reducing oxo to hydroxyl groups is used.

3. Process according to claim 1, wherein an aerobic culture of a micro-organism reducing a carbon-to-carbon double bond is used.

4. Process for splitting racemates of a d,l-steroids, which comprises subjecting a member selected from the group consisting of a pregnane-, androstane-, and oestrane compound containing as reducible groupings at least one member selected from the group consisting of a carbon-to-oxygen and of a carbon-to-carbon double bond to the action of a reducing enzyme produced by the culture of a micro-organism, whereby at least one of the reducible groups of the d-antipode of the starting racemate is reduced and the l-antipode remains unchanged, and isolating at least one of the enantiomorphic forms.

5. Process according to claim 4, wherein d,l-desoxycorticosterone is used as starting material.

6. Process according to claim 4, wherein d,l-androstendione is used as starting material.

7. Process according to claim 4, wherein d,l-oestrone is used as starting material.

8. Process according to claim 4, wherein d,l-$\Delta^4$-3,20-dioxo-11β-hydroxy-pregnene-18-acid lactone (18→11) is used as starting material.

9. Process according to claim 4, wherein the lactone of d,l-$\Delta^4$-3,16-dioxo-11β-hydroxy-18-carboxy-androstene is used as starting material.

10. Process according to claim 4, wherein d,l-$\Delta^{4,16}$-3,16-dioxo-11β,18-oxido - 18α - methyl - 18 - homoandrostadiene is used as starting material.

11. Process according to claim 1, wherein a culture of *Saccharomyces cerevisiae* is used.

12. Process according to claim 1, wherein a culture of *Bacterium putrificus* is used.

13. Process according to claim 1, wherein a culture of fungi selected from the groups consisting of the species *Streptomyces lavendulae* and *Streptomyces coelicolor* is used.

14. Process according to claim 4, wherein d:l-$\Delta^4$-17α-hydroxy-cortexone is used as starting material.

15. Process according to claim 1, wherein a culture of *Streptomyces coelicolor* is used.

References Cited in the file of this patent

UNITED STATES PATENTS

| | | |
|---|---|---|
| 2,186,906 | Mamoli | Jan. 9, 1940 |
| 2,374,680 | Hoehn | May 1, 1945 |
| 2,511,867 | Neuberg et al. | June 20, 1950 |
| 2,616,828 | Levinton | Nov. 4, 1952 |
| 2,649,401 | Haines et al. | Aug. 14, 1953 |

OTHER REFERENCES

Karrer: Organic Chemistry, 4th English edition, Elsevier Pub. Co., Inc., 1950, page 103.